US009803890B2

(12) United States Patent
Murphy

(10) Patent No.: US 9,803,890 B2
(45) Date of Patent: Oct. 31, 2017

(54) SOLAR ENERGY SYSTEM

(71) Applicant: James Murphy, London (GB)

(72) Inventor: James Murphy, London (GB)

( * ) Notice: Subject to any disclaimer, the term of this patent is extended or adjusted under 35 U.S.C. 154(b) by 74 days.

(21) Appl. No.: 14/438,363

(22) PCT Filed: Oct. 25, 2013

(86) PCT No.: PCT/GB2013/052793
§ 371 (c)(1),
(2) Date: Apr. 24, 2015

(87) PCT Pub. No.: WO2014/064458
PCT Pub. Date: May 1, 2014

(65) Prior Publication Data
US 2015/0292772 A1    Oct. 15, 2015

(30) Foreign Application Priority Data

Oct. 25, 2012 (GB) .................................. 1219190.4

(51) Int. Cl.
*F24J 2/04* (2006.01)
*F24J 2/42* (2006.01)
(Continued)

(52) U.S. Cl.
CPC .............. *F24J 2/423* (2013.01); *E04H 4/129* (2013.01); *F24J 2/0461* (2013.01); *F24J 2/244* (2013.01);
(Continued)

(58) Field of Classification Search
CPC .................... E04H 1/00; F24J 2/423
(Continued)

(56) References Cited

U.S. PATENT DOCUMENTS 4,083,356 A * 4/1978 Rajagopal .................. F24J 2/20
126/595
4,090,496 A 5/1978 Mallet
(Continued)

FOREIGN PATENT DOCUMENTS

CN    101538944 A    9/2009
CN    101539337 A    9/2009
(Continued)

OTHER PUBLICATIONS

Davies, Gareth; Search Report with Examination Opinion for patent application No. GB1219190.4; UK Intellectual Property Office; Newport, South Wales; Nov. 8, 2012.
(Continued)

*Primary Examiner* — Avinash Savani
(74) *Attorney, Agent, or Firm* — Thomas E. Lees, LLC

(57) ABSTRACT

A system comprising a structure (1) defining a volume for containing or receiving a body of water. The system further comprises a solar energy system for heating a body of water. The system comprises a solar radiation receiving unit (2) configured to receive solar radiation and configured to convert said solar radiation into heat energy. The system also comprises a barrier means (3) of varying solar radiation transmittance arranged over said solar radiation receiving unit (2). The barrier means (3) is configured to varyingly control the solar radiation receivable by said solar radiation receiving unit (2).

6 Claims, 5 Drawing Sheets

(51) Int. Cl.

| | | |
|---|---|---|
| *F24J 2/24* | (2006.01) | |
| *F24J 2/40* | (2006.01) | |
| *F24J 2/50* | (2006.01) | |
| *F28D 20/00* | (2006.01) | |
| *E04H 4/12* | (2006.01) | |
| *F24J 2/52* | (2006.01) | |

(52) U.S. Cl.
CPC ............... *F24J 2/407* (2013.01); *F24J 2/505* (2013.01); *F28D 20/0034* (2013.01); *F24J 2002/5275* (2013.01); *F28D 2020/0078* (2013.01); *Y02E 10/44* (2013.01); *Y02E 60/142* (2013.01); *Y02E 70/30* (2013.01)

(58) Field of Classification Search
USPC .................................................. 126/714, 564
See application file for complete search history.

(56) References Cited

U.S. PATENT DOCUMENTS

| 4,237,860 | A | | 12/1980 | Caroon | |
|---|---|---|---|---|---|
| 4,337,998 | A | * | 7/1982 | Basiulis | ............... F24J 2/0433 359/591 |
| 4,510,920 | A | | 4/1985 | Walmet | |
| 5,431,148 | A | | 7/1995 | Kronberg | |
| 6,293,278 | B1 | | 9/2001 | Diffley | |
| 2008/0216986 | A1 | | 9/2008 | Sweet | |
| 2008/0245412 | A1 | | 10/2008 | Uehlin | |

FOREIGN PATENT DOCUMENTS

| DE | 4443805 | A1 | 6/1996 |
|---|---|---|---|
| DE | 202005007474 | U1 | 10/2006 |
| DE | 202009002085 | U1 | 7/2009 |
| DE | 202009018167 | U1 | 6/2011 |
| FR | 2923898 | A1 | 5/2009 |
| GB | 2152651 | A | 8/1985 |
| JP | 5595067 | A | 7/1980 |
| JP | 59004856 | A | 1/1984 |
| JP | 2161091 | A | 6/1990 |
| SU | 1310591 | A1 | 5/1987 |
| WO | 94/02313 | A1 | 2/1994 |
| WO | 2010065986 | A1 | 6/2010 |

OTHER PUBLICATIONS

Woods, Brian; Further Search Report for patent application No. GB1219190.4; UK Intellectual Property Office; Newport, South Wales; Jun. 18, 2013.

Walker, Colin; Examination Report for patent application No. GB1219190.4; UK Intellectual Property Office; Newport, South Wales; Oct. 18, 2013.

Walker, Colin; Examination Report for patent application No. GB1219190.4; UK Intellectual Property Office; Newport, South Wales; Jul. 18, 2014.

Walker, Colin; Examination Report for patent application No. GB1219190.4; UK Intellectual Property Office; Newport, South Wales; Nov. 28, 2014.

Dennehey, Sean; Notification of Grant for patent application No. GB1219190.4 (GB Patent No. 2507303); UK Intellectual Property Office; Newport, South Wales; Feb. 10, 2015.

Vesselinov, Vladimir; International Search Report for International Patent Application No. PCT/GB2013/052793, date of mailing Feb. 14, 2014; European Patent Office; Rijswijk, Netherlands.

* cited by examiner

SOLAR ENERGY SYSTEM

CROSS-REFERENCE TO RELATED APPLICATIONS

This application is a §371 National Stage Entry Application of International Application No. PCT/GB2013/052793, filed Oct. 25, 2013, published as "SOLAR ENERGY SYSTEM FOR A SWIMMING POOL", which claims the benefit of GB Application No. 1219190.4 (now GB2507303B), filed Oct. 25, 2012, entitled "SOLAR ENERGY SYSTEM", the disclosures of which are incorporated herein by reference.

BACKGROUND

The present invention relates to a system comprising a solar energy system for heating a body of water, a solar energy system, a structure for containing a body of water and a method of heating a body of water. In particular, but not exclusively, the invention relates to a system for heating a swimming pool.

Many swimming pools, particularly those that are outdoors, are unhealed and so, in colder climates or during cooler times of the day, they are uninviting and uncomfortable in which to swim. With a view to alleviating this problem, it is known to incorporate a heating system by which heated water is supplied to the swimming pool. Such heating systems typically comprise a gas or electrical boiler and a network of pipes through which heated water is passed to the swimming pool. Large bodies of water, such as swimming pools, are known to require a significant quantity of heat in order to raise the temperature of the water to a more pleasant temperature. This is due to the large specific heating capacity of water and the high rate of heat loss to the external environment, predominately through passive and forced convection, as a result of wind passing above the swimming pool, and conduction of heat through the swimming pool's walls. Existing heating systems comprising a gas or electrical boiler can thus be very expensive to run. Furthermore, such methods of providing heated water typically require the consumption of large quantities of fuel and so are not particularly environmentally friendly. Many have therefore strived to find alternative sources of heat by which to heat swimming pools.

A known solar heater for a swimming pool, such as that described in GB2454180, comprises a flexible buoyant solar radiation receiving sheet for use in a swimming pool. The sheet is spooled off of a poolside reel and is laid onto the surface of the swimming pool water. However, swimmers are not able to use the pool while the system is in use.

A further known solar heater for a swimming pool comprises an immersible solar radiation receiving panel. In order to heat the body of water, the panel is placed inside the body of water and is held at a certain depth by a system of floats, weights and tethers. However, again, swimmers cannot use the pool while the heater is in operation as they may become entangled by the tethers.

The present invention aims to alleviate, at least to a certain extent, the problems and/or address at least to a certain extent the difficulties associated with the prior art.

BRIEF SUMMARY

According to a first aspect of the present invention, there is provided a solar energy system for heating a body of water, the system comprising: a solar radiation receiving unit configured to receive solar radiation and configured to convert said solar radiation into heat energy and a barrier means of varying solar radiation transmittance arranged over said solar radiation receiving unit, the barrier means configured to varyingly control the solar radiation receivable by said solar radiation receiving unit.

The variable control of the solar radiation receivable by said solar radiation receiving unit enables the solar energy system to varyingly control the degree to which a body of water is heated. The conversion of solar radiation directly into heat energy enables the solar energy system to more efficiently provide heat to a body of water.

According to a second aspect of the present invention, there is provided a solar energy system for heating a body of water, the system comprising: a solar radiation receiving unit configured to receive solar radiation and configured to convert said solar radiation into electrical energy and a barrier means of varying solar radiation transmittance arranged over said solar radiation receiving unit, the barrier means configured to varyingly control the solar radiation receivable by said solar radiation receiving unit.

The variable control of the solar radiation receivable by said solar radiation receiving unit enables the solar energy system to varyingly control the degree to which a body of water is heated. The conversion of solar radiation energy into electrical energy enables the collected energy to be transferred to a body of water via a conventional electrical means or to be stored indefinitely for later use.

Optionally, the solar radiation receiving unit is configured to absorb heat energy. In this way, heat may collected and/or transferred from the solar radiation receiving unit, for example using an internal network of pipes carrying a heat conducting fluid.

Optionally, in the second aspect of the present invention, the solar radiation receiving unit comprises a photovoltaic cell.

Photovoltaic cells, a form of photoelectric cell and more commonly known as solar cells, provide an efficient convenient and well-established way of converting solar radiation into heat energy.

Optionally, the barrier means is configured to varyingly control the transmittance of light therethrough.

The ability to varyingly control the transmittance of light enables the quantity of solar radiation transmitted through the barrier means, and thus the quantity of solar radiation incident on the solar radiation receiving unit to be controlled.

Optionally, the barrier means is formed as a static panel. Optionally, the static panel of the barrier means is substantially rigid. Optionally, the barrier means comprises a layer of glass or plastic, or some other material of substantially high solar radiation transmittance. Optionally, the barrier means is substantially transparent in a first state. Optionally, the barrier means is static while the light transmittance therethrough is varyingly controlled. Optionally, the barrier means comprises no moving parts. Optionally, the barrier means remained fixed relative to the solar radiation receiving unit in use.

Optionally, the barrier means is located substantially coextensive with the solar radiation receiving means.

This arrangement enables the barrier means to substantially vary the quantity of solar radiation incident over the whole of the solar radiation receiving means.

Optionally, the barrier means is arranged spaced from the solar radiation receiving unit.

In operation, the temperature of the solar radiation receiving unit may increase and may be above a temperature comfortable to touch by a user of the pool. The temperature of the solar radiation receiving unit may also affect the function of the barrier means and/or warm it up. The provision of a space between the barrier means and the solar radiation receiving unit reduces the rate of heat transfer between the radiation receiving unit and the barrier means and thus prevents the heat from the solar radiation receiving unit from adversely affecting the barrier means and prevents a user of the pool coming into contact with surfaces which may be at temperatures which are uncomfortable to touch.

Optionally, the barrier means is configured to be substantially rigid.

A substantially rigid panel ensures that the barrier means can be used within a conventional swimming pool and is able to endure the typical loads that may arise as a result of its such use. Optionally, the substantially rigid panel is able to support the weight of a person without damage to, or significant deflection of, the panel. To Increase the rigidity of the static panel, a support structure is optionally provided. The support structure optionally comprises an array of support members underneath the static panel which are distributed at regular intervals.

Optionally, the barrier means is hingedly connected to allow access to the solar radiation receiving unit when the solar energy system is not in use.

A hinged connection enables the barrier means to be removed for maintenance purposes. Optionally, the barrier means is located within a hingedly attached bracket system into or from which the barrier means may be received or extracted. The bracket system optionally comprises a flat plate from which extend a plurality or arms which are configured to receive and/or restrain the barrier means.

Optionally, the barrier means is configured to transition or be switchable between a state in which the barrier means is substantially transparent and a state in which the barrier means is substantiality opaque.

The barrier means may thus significantly alter the quantity of light incident on the solar radiation receiving unit below. The barrier means may also occupy one or more intermediate transmittances between substantially transparent and substantially opaque. The barrier means may smoothly transition from being substantially transparent and substantially opaque, or vice-versa. The transmittance of the barrier means may also be precisely selected to lie anywhere between substantially transparent or substantially opaque in order to provide a specific quantity of light to the solar radiation receiving unit. In cases where the barrier means does not absorb light but solar radiation elsewhere along the electromagnetic spectrum, the barrier means may be configured to transition or be switchable between a state in which the barrier means substantially inhabits or permits the transmittance of solar radiation. The barrier means may thus be configured to transition or be switchable between a state of substantially high solar radiation transmittance and a state of substantially low solar radiation transmittance.

Optionally, the barrier means comprises a plurality of areas, wherein the solar radiation transmittance of each area may be individually controlled.

The barrier means may thus be controlled to possess a plurality of areas of varying solar radiation transmittance. This is beneficial in cases where the solar radiation incident on the barrier means is greater in one area of the barrier means than in another. Where the solar radiation is intense in one particular area, it may be beneficial to dim that area of the barrier means in order to prevent over-exposure of the solar radiation receiving unit. A constant overall solar radiation absorption rate of the solar radiation receiving unit could be maintained by increasing the transmittance of the barrier means elsewhere.

Optionally, the barrier means comprises an electrochromic material. Alternatively, any material or structure which changes transparency as a result of a voltage or current being applied or connected thereto may be used. Such materials or structures may include Liquid Crystal Displays (LCDs).

An electrochromic material enables the transmittance of the barrier means to be varied by an electrical means.

Optionally, the electrochromic material is configured to change its light transmittance when a voltage is applied thereto.

The changing of the transmittance of the electrochromic material by application of a voltage enables the transmittance to be altered by an electrical means and be readily controlled.

Optionally, the electrochromic material comprises, or is, a glass material.

Such a material may be more commonly referred to as smart glass. The electro-chromic material comprising a glass material enables the barrier means to be manufactured in long, thin, flat and substantially rigid panes or sheets.

The electrochromic material may also comprise plastic or some other polymer. Optionally, the electrochromic material comprises polyaniline, a viologen, a polyoxotungstate, tungsten oxide, or other such material known to possess electrochromic properties.

Such electrochromic materials are effective as an electrochromic barrier as they may be varied between a substantially transparent state and a substantially opaque state.

Optionally, the system further comprises control means configured to automatically control the solar radiation transmittance of the barrier means based on a predetermined parameter.

An automatic control means enables the solar radiation transmittance of the barrier means to be varied more frequently and more accurately and does not require frequent intervention from an operator. The control means may either be open-loop or closed-loop. A control means based on a predetermined parameter controls the solar radiation transmittance of the barrier means according to one or more properties of an internal or external environment. The predetermined parameter may be constant or may vary with time. Such parameters may include the ambient outside or inside air temperature, the temperature of a body of water, the intensity of solar radiation, the time of the day or year, wind velocity, humidity, or a certain voltage, current or electrical resistance directly or indirectly indicating any such parameter.

Optionally, the predetermined parameter is temperature.

The measurement of temperature more directly and more accurately indicates the degree to which further heat must be supplied to the body of water and so gives a better indication of the optimal light transmittance of the barrier means in order for the body of water to reach the desired temperature. The temperature may be that of the ambient air, a body of water, the barrier means, the solar radiation receiving unit or some other component of the solar energy system.

Optionally, the system further comprises a sensor for measuring the predetermined parameter.

A sensor provides a means of enabling the control means to monitor some aspect of the internal and external conditions and to adjust the solar radiation transmittance of the barrier means accordingly. Such sensors may include thermometers, thermocouples, thermistors, actinometers, humistors, hygrometers, pyranometers, pyrgeometers, anemometers, bolometers, photoresisters, ammeters, voltmeters, or electrometers.

Optionally, the sensor is wirelessly connected to the control means.

A wireless sensor that is wirelessly connected to the control means enables the wireless sensor to be located some distance away from the control means without a significant length of cabling running between the sensor and the central means.

Optionally, the control means is configured to be wirelessly activated or deactivated.

A wirelessly activated or deactivated control means enables the operator to be situated some distance from the control means. Consequently, the control means does not have to be easily accessible. The control means may also be operated more conveniently and does not require lengths of cabling which would be unsightly and expensive to install.

Optionally, the solar radiation receiving unit comprises a solar water heater. The solar radiation receiving unit may be termed as a substantially black body, at least on surfaces thereof upon which solar radiation is incident.

Such a solar radiation receiving unit enables the solar radiation energy to be directly transferred as heat energy to a body of water.

Optionally, the solar water heater is an active system. Such an active system has means to transfer heat absorbed by the solar radiation receiving unit.

An active solar water heater is capable of varyingly controlling the heat transferred to the body of wafer and away therefrom.

Alternatively or additionally, the solar radiation receiving unit, which may comprise a solar water heater, may operate in a passive mode where the solar radiation receiving unit transfers heat absorbed to a body of water in contact with a surface of solar radiation receiving unit by conduction.

Optionally, the system further comprises pump means for pumping a fluid through said solar radiation receiving unit.

Fluid may thus be used to extract energy from the solar radiation receiving unit.

Optionally, the system comprises a further pump means for pumping fluid through the system. Optionally, the pump means is configured, in use, to pump fluid from the solar radiation receiving unit to the water tank. Optionally, this fluid is a heat transfer medium.

Optionally, the system further comprises an energy storage means.

The system is thus capable of storing the energy extracted from the solar radiation receiving unit. Such an energy storage means may comprise a water tank, an electrical battery, cell or capacitor or any other such method of storing energy.

In the case of a water tank, energy may thus be stored in the form of heat energy within the water of the water tank for later use. Optionally the tank is closed, i.e. not open to the atmosphere. Optionally, the tank is substantially thermally insulated from the external environment, optionally by way of thermal insulation.

Optionally, the energy storage means according to the second aspect of the present invention comprises an electrical cell, battery or capacitor. Such devices are conventional means of storing electrical energy, although any such conventional method of storing energy as electrical energy is envisioned.

Energy may thus be stored in the form of electrical energy for later use.

Optionally, the system further comprises a heat exchanger for transferring heat from the solar radiation receiving unit to the energy storage means. The pumping means can be used to pump a fluid through the heat exchanger, which may for example comprise a coil, from the solar radiation receiving unit.

The heat exchanger allows heat from the solar radiation receiving unit to be transferred to the energy storage means. This provides an efficient way of transferring heat from one source to another without removing water or fluid from the system. An electrical heating element could alternatively be used where the collected energy has previously been converted into electrical energy.

Optionally, the energy storage means is connected to an appliance, such as a shower. Connecting the energy storage means to an appliance enables the collected energy to be used in an alternative appliance or for an alternative application. In particular, the energy storage means could comprise a water tank which is provided with an outlet pipe, the outlet pipe providing heated water to a shower or other such domestic appliance for which heated water is required.

Optionally, the system comprises a further heat source, for example a gas boiler, for supplying energy to the energy storage means.

An alternative heat source supplies heat energy to the energy storage means when the solar radiation receiving unit is unable to provide the requisite quantity of heat, for example to maintain the temperature of water in a water tank, fluid circuit or other body of water above a certain temperature. As the solar radiation receiving unit is dependent on the quantity of light incident on it, a further heat source enables energy to be supplied to the energy storage means when the quantity of available light is low, for example during the night or during periods of unfavourable weather.

Optionally, the pump means is activated dependent on a predetermined parameter, for example the temperature of a body of water. The control means may be configured or programmed to operate the barrier means and/or the pump means.

The fluid flow rate through the solar receiving unit may thus be controlled according to a certain parameter and so the fluid flow rate may be controlled at will.

Optionally, a substantially reflective material extends from the perimeter of the barrier means to the perimeter of the solar radiation receiving unit.

The substantially reflective material ensures that the solar radiation receiving unit receives a greater proportion of the radiation passing through the barrier means.

Optionally, the barrier means is arranged or fluid passages are provided in the barrier means to permit fluid to flow over the solar radiation receiving unit.

Water from a body of water may thus pass into the space between the barrier means and the solar radiation receiving unit and flow over the surface of the solar radiation receding unit. The flow of water over the surface of the solar radiation receiving unit serves to transfer some of the received solar radiation energy to the water as heat energy, thus increasing the temperature of the water. The fluid passages may be provided around the perimeter of the barrier means and/or may be provided at spaced intervals or in an array on the surface of the barrier means.

Alternatively, the barrier means and solar radiation receiving unit are formed as a sealed unit and arranged to prevent the ingress of water or fluid to the surface of the solar radiation receiving unit. In this way, the barrier means, may provide a barrier to the ingress of water and protect the surface of the solar radiation receiving unit for example in the form of a solar cell or photovoltaic cell from environmental damage. This may be of particular benefit if the sealed unit is located in salt water, for example under the sea.

Advantageously, the provision of a fluid circuit and a pump means configured to pump fluid through the fluid circuit enables multiple appliances fluidly connected at various points along the fluid circuit, to be supplied with heated water. A pump means circulates the heated water within the fluid circuit so that each appliance has ready access to heated water.

Optionally, the system comprising a fluid circuit fluidly connected to said water tank and a fluid circuit pump means configured to pump fluid through the fluid circuit. Optionally, the fluid circuit pump means is configured or is provided as a twin pump, optionally with the pumps being arranged in parallel.

Optionally, the fluids circuit is fluidly connected to one or more appliances, for example a shower or bath.

Optionally, the fluid circuit pump means is configured to be activated when the temperature in the tank or fluid circuit falls below a predetermined temperature.

According to a third aspect of the present invention, there is provided a structure for containing a body of water, the structure comprising a solar energy system according to the first aspect of the invention.

The integration of a solar energy system within a structure for containing a body of water enables the solar energy system to be used to heat a body of water contained in the structure.

Optionally, the solar energy receiving means is provided in a recess in a wall of the structure. Optionally, the said fluid passage or passages are provided as a gap between the barrier means and the recess of the structure.

Locating the solar energy receiving means within a recess lessens the degree to which the solar energy receiving means encroaches upon the water-containing volume of the structure and so provides less of an obstruction to objects moving within the water-containing volume.

Optionally, the barrier means is arranged in substantial planar alignment with a wall of the structure.

The substantial planar alignment of the barrier means provides a substantially continuous surface with that of the surrounding wall of the structure which consequently reduces the risk of objects snagging on the barrier means. This arrangement also provides protection to the solar radiation receiving unit by providing a shield to protect against objects that might have otherwise caused damage to the solar radiation receiving unit. Optionally, the barrier means is provided with a curved profile.

Optionally, the solar radiation receiving unit and barrier means are provided, in use, submerged in a body of water contained in said structure.

Advantageously, the submersion of the solar radiation receiving unit and barrier means enables the solar radiation receiving unit to directly heat the water contained in the structure without the need for a network of pipes to carry water from one to the other.

Optionally, one or more of the structured walls comprises one or more substantially reflective surfaces.

Advantageously, substantially reflective walls increase the intensity of light incident on the barrier means and so increase the maximum quantity of solar radiation available to the solar radiation receiving unit.

Optionally, the structure is a swimming pool.

Other structures comprising a solar energy system in which people may bathe may be envisioned, such as a hot tub, bathtub, spa or other such structure.

According to a fourth aspect of the invention, there is provided a method of heating a body of water using a solar energy system according to the first aspect comprising the steps of: configuring the barrier means in a first state in which it substantially permits the transmission of solar radiation; and configuring the barrier means in a second state in which it substantiality prevents the transmission of solar radiation once a predetermined temperature has been reached in the body of water.

This method enables the temperature of the body of water to be controlled.

Optionally, the barrier means is configured in the said first state when the temperature in the body of water falls below a predetermined temperature.

Optionally, a pump means is activated for pumping fluid through the solar receiving unit when a predetermined temperature has been reached in the body of water. This enables excess heat to be extracted from the solar radiation receiving unit.

Optionally, the fluid circuit pumping means is activated for pumping fluid through the fluid circuit unit when a temperature in the fluid circuit or tank falls below a predetermined temperature. Such a method can be used with a view to keeping the temperature above a predetermined temperature to reduce or eliminate the growth of *Legionella* bacteria.

According to a fifth aspect of the present invention, there is provided a method of heating a body of water using a solar energy system, wherein the system composes a solar radiation receiving unit configured to receive solar radiation and configured to convert said solar radiation into heat energy; pump means for pumping a fluid through said solar radiation receiving unit; a water tank; the pump means being configured to pump fluid from the solar radiation receiving unit to the water tank; a fluid circuit fluidly connected to said water tank and a fluid circuit pump means configured to pump fluid through the fluid circuit, the method comprising the steps of: activating the fluid circuit pumping means for pumping fluid through the fluid circuit unit when a temperature in the fluid circuit or tank falls below a predetermined temperature. This method may be used to maintain water in a water circuit above a predetermined temperature, preferably above 45 degrees centigrade and reduce the likelihood of the formation of bacteria, for example *Legionella*.

According to a sixth aspect of the present invention, there is provided a system comprising a structure defining a volume for containing or receiving a body of water, the system comprising a solar energy system provided within said volume for heating said body of water, the solar energy system comprising: a solar radiation receiving unit configured to receive solar radiation and configured to convert said solar radiation into heat energy; and a barrier means of varying solar radiation transmittance arranged over said solar radiation receiving unit, the barrier means configured to varyingly control the solar radiation receivable by said solar radiation receiving unit. The structure is configured, for example by being open on a top side to permit light to irradiate a body of water when contained in the structure.

Optionally, the solar radiation receiving unit and/or barrier means is provided adjacent a wall, preferably the base wall of the structure and/or in a recess in a wall of the structure, optionally in a base wall or side wall of the structure. The radiation receiving unit preferably faces into the interior of the volume.

Optionally, the barrier means is arranged in substantial alignment with a wall of the structure, optionally at an angle to the horizontal.

Optionally, the solar energy receiving unit and barrier means are provided, in use, submerged in a body of water contained in said structure.

Optionally, one or more of the structure's walls comprises one or more substantially reflective surfaces.

Optionally, the structure is a swimming pool.

Optionally, the solar radiation receiving unit is configured to absorb heat energy.

Optionally, the solar radiation receiving unit comprises a photovoltaic cell.

Optionally, the barrier means is configured to varyingly control the transmittance of light therethrough.

Optionally, the barrier means is formed as a static panel.

Optionally, the barrier means is located substantially coextensive with the solar radiation receiving means.

Optionally, the barrier means is arranged spaced from the solar radiation receiving unit.

Optionally, the barrier means is configured to be substantially rigid.

Optionally, the barrier means is hingedly connected to allow access to the solar radiation receiving unit when the solar energy system is not in use.

Optionally, the barrier means is configured to transition or be switchable between a state in which the barrier means is substantially transparent and a state in which the barrier means is substantially opaque.

Optionally, the barrier means comprises a plurality of areas, wherein the solar radiation transmittance of each area may be individually controlled.

Optionally, the barrier means comprises an electrochromic material.

Optionally, the electrochromic material is configured to change its light transmittance when a voltage is applied thereto.

Optionally, the electrochromic material comprises a glass material.

Optionally, the system further comprises control means configured to automatically control the solar radiation transmittance of the barrier means based on a predetermined parameter.

Optionally, the predetermined parameter is temperature, for example the temperature in a body of water contained within said volume.

Optionally, the system further comprises a sensor for measuring the predetermined parameter.

Optionally, the sensor is wirelessly connected to the control means.

Optionally, the control means is configured to be wirelessly activated or deactivated.

Optionally, the solar radiation receiving unit comprises a solar water heater, for example comprising a black body absorber.

Optionally, the solar water heater is an active system.

Optionally, the system further comprises a first pump means for pumping a fluid through said solar radiation receiving unit.

Optionally, the system further comprises a first fluid circuit fluidly isolated from the body of water in said volume, through which fluid can be pumped through said radiation receiving unit.

Optionally, the system further comprises an energy storage means.

Optionally, the energy storage means comprises a fluid or water tank.

Optionally, the first pump means is configured, in use, to pump fluid from the solar radiation receiving unit to the water tank.

Optionally, the system further comprises a heat exchanger for transferring heat from the solar radiation receiving unit to the energy storage means.

Optionally, the heat exchange is fluidly connected to the first fluid circuit.

Optionally, the energy storage means is fluidly connected to an appliance, such as a shower.

Optionally, the system comprises a secondary fluid circuit fluidly connected to said energy storage means.

Optionally, the secondary fluid circuit is fluidly isolated from the first fluid circuit.

Optionally, the system comprises a second pump means for pumping fluid around the secondary fluid circuit.

Optionally, the second pump means is activated dependent on a predetermined parameter.

Optionally, the predetermined parameter is temperature.

Optionally, the pump is configured to be activated when the temperature in the secondary circuit or energy storage means falls below a predetermined temperature.

Optionally, a substantially reflective material extends from the perimeter of the barrier means to the perimeter of the solar radiation receiving unit.

Optionally, the barrier means is arranged or fluid passages are provided in the barrier means to permit fluid to flow over the solar radiation receiving unit.

Optionally, the barrier means and solar radiation receiving unit are formed as a sealed unit and arranged to prevent the ingress of water or fluid to the surface of the solar radiation receiving unit.

Optionally, the secondary fluid circuit is fluidly connected to one or more appliances, for example a shower or bath.

Optionally, the second pump means comprises a twin pump.

Optionally, the system comprises a further heat source, for example a gas boiler, for supplying energy to the energy storage means.

According to a seventh aspect of the present invention, there is provided a method of heating a body of water using a system according to any of the above aspects comprising the steps of: configuring the barrier means in a first state in which if substantially permits the transmission of solar radiation; and configuring the barrier means in a second state in which it substantially prevents the transmission of solar radiation once a predetermined temperature has been reached in the body of water.

Optionally, the barrier means is configured in the said first state when the temperature in the body of water falls below a predetermined temperature.

Optionally, the first pump means is activated for pumping fluid through the solar receiving unit when a predetermined temperature has been reached or exceeded in the body of water.

Optionally, the second pump means is activated for pumping fluid through the secondary fluid circuit unit when a temperature in the fluid circuit or tank falls below a predetermined temperature.

Optionally, the first or second pump means is deactivated when the barrier means is configured to prevent the transmission of solar radiation.

Optionally, the barrier means is configured in the said first state when the temperature of fluid in the secondary circuit or tank falls below a predetermined temperature.

Optionally, the predetermined temperature is 45 degrees centigrade.

BRIEF DESCRIPTION OF THE SEVERAL VIEWS OF THE DRAWINGS

The present invention may be carried out in various ways and embodiments of the invention will now be described by way of example with reference to the accompanying drawings in which:

FIG. 8 is a section perspective view of a swimming pool with electrochromic glass and solar water heater recessed in the floor of the swimming pool with a support structure and showing the inlet and outlet to the solar water heater;

DETAILED DESCRIPTION

Figure 1:
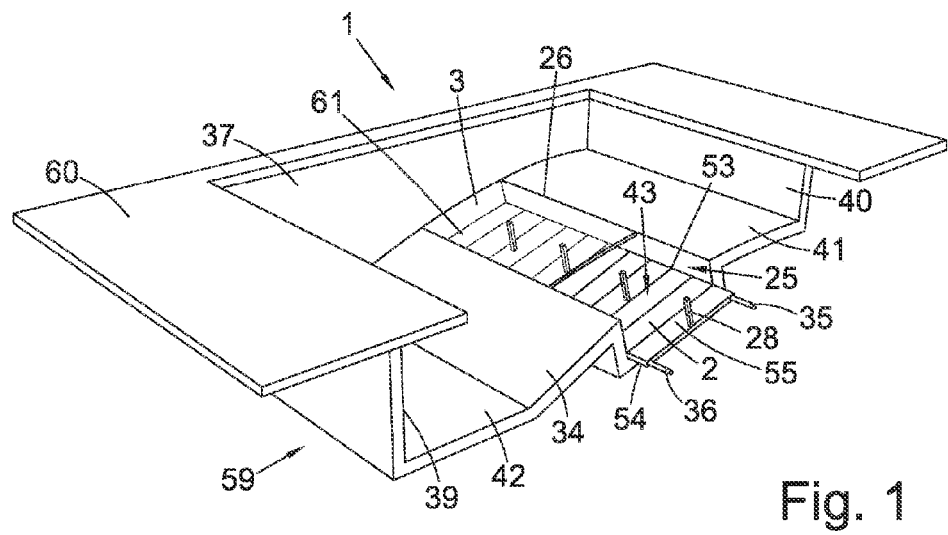
FIG. 1 is a perspective cutaway view of a swimming pool with electrochromic glass arranged over a solar water heater.

An example of a solar energy system for heating a body of water is shown in FIG. 1. The system comprises a solar radiation receiving unit 2, in the embodiment in the form of a solar water heater and a barrier means of varying solar radiation transmittance 3 arranged over said solar radiation receiving unit 2. The system can be used to heat a body of water within a swimming pool 1.

The swimming pool structure 59 is recessed into the surrounding ground. A poolside surface 60 forms a margin around the perimeter of the swimming pool 1. For illustrative purposes, the swimming pool 1 is shown without the swimming pool water. The structure of the swimming pool 59 comprises four vertical walls; two opposing longitudinal, vertical and generally planar walls 37, 38, one of which 38 is not shown for clarity, and two opposing lateral, vertical and generally planar walls 39, 40. A base wall 34 forms the floor of the pool. One of the lateral walls 39 extends vertically downwards more so than the other lateral wall 40 so that one end of the swimming pool 1 is deeper than at the other end.

The deepest end of the swimming pool 1 comprises a flat planar floor 42 which extends horizontally from the base of the lateral, vertical wall 39 at the deepest end. The flat planar floor 42 extends to approximately a quarter of the length of the swimming pool 1. The remaining length 41 of the swimming pool's floor 1 is curved. The curved floor 41 curves upwards in a substantially convex form from the flat planar floor 42 to meet the bottom of the lateral vertical wall 40 at the shallowest end.

In this example the solar radiation receiving unit comprises four rectangular and substantially planar solar-radiation receiving panels 2. The panels are recessed into the curved section of the swimming pool floor 41 and lie such that they are inclined to the horizontal. The angle of inclination is chosen such that the intensity of solar radiation received by the panels is optimised, for example depending on the peak intensity of the sun in the part of the world where the system is installed. The panels are formed with a substantially black surface or layer in order to absorb energy from the solar-radiation incident on the panels. A glass panel may be provided in front of the black surface. The panels are aligned in a row which extends substantially across the width of the swimming pool 1, perpendicular to the vertical swimming pool walls 37, 38 at either end of the row.

The panels each comprise a network of tubes 43 which pass within each panel. The network of tubes is configured to allow fluid to pass through the network. This fluid could be antifreeze, water, a mixture of both or any other suitable fluid for carrying heat and remaining in liquid state at all temperatures and pressures which the fluid may reasonably be expected to encounter within the tubes. The network of tubes comprises two lateral tubes 53, 54 which run parallel to the width of each panel. The two lateral tubes 53, 54 are spaced apart from each other such that they are located at opposing ends of the panel. The two lateral tubes 53, 54 extend through the entire width of the panel, thus forming two apertures on one of the longitudinal side faces of the panel and two on the other longitudinal side face. The two apertures on each of the side faces form a fluid inlet 35 and a fluid outlet 36 to the network of tubes 43 within each panel. A plurality of transverse, linear tubes 55 run from one lateral tube 53 to the other lateral tube 54, thus forming a parallel circuit. The transverse tubes 55 are spaced at equal intervals along the length of the lateral tubes 53, 54. Fluid may thus pass from one lateral tube 53, through the plurality of longitudinal tubes 55, to the other lateral tube 54. The inlet 35 and outlet 36 apertures of the row of panels 2 are interconnected such that fluid may pass from one panel to the next panel in the row. The distal panel 61 comprises inlet and outlet apertures in only one of its longitudinal side faces such that the fluid that flows through the most distal panel enters the panel by only one inlet and exits by only one outlet.

Barrier means of varying solar radiation transmittance, in the embodiment in the form of electrochromic glass panes 3, sit above the panels 2 such that a space 25 is formed between the glass panes 3 and the solar radiation receiving units or panels 2.

Electrochromic glass is more commonly known to those skilled in the art as 'smart glass'. Electrochromic glass is configured to change its light transmittance properties when a voltage is applied. The glass panes 3 are aligned in a row of substantially the same area as, and coextensive with, the row of panels 2. The row of glass panes 3 extends substantially across the width of the swimming pool 1, perpendicular to the vertical swimming pool walls 37, 38 at either end of the row of glass panes 3. The glass panes 3 are of substantially the same curvature as that of the curved section 41 of the swimming pool floor 34. The glass panes are spaced above the panels 2 such that their upper surface aligns with the surrounding swimming pool floor 41. The row of glass panes 3 are sized such that a gap between the glass panes 3 and the surrounding swimming pool floor 41 is provided around the perimeter of the row of glass panels by which water may enter the space 25 between the glass panes 3 and the panels 2. Support members 28 are fixed substantially perpendicular to the active surface of the panels. The support members are spaced at regular intervals along the centreline of the row of panels 2. The support members 28 are square in cross section and extend from the upper surface of the panels 2 to the lower surface of the glass panes 3.

The barrier means in the form of glass panes 3 is transparent in a first state so that light is able to pass through the glass panes. Upon passing through the glass panes 3, the light irradiates the panels 2 which lie below the glass panes 3. The panels 2 absorb energy from the incident light and convert the energy of the light into thermal energy. The thermal energy is then absorbed by both the water within the space 25 above the panels 2 and by the liquid within the tubes which pass through the panels 2. The heated water within the space 25 passes through the perimeter gap between the glass panes 3 and the surrounding swimming pool floor 41, and mixes with the main body of water within the swimming pool 1. The temperature of the swimming pool water can thus be increased. The pool may be provided with a conventional filtering unit which comprises a pump. The pumping of the water in the pool by such a pump can serve to facilitate the flow of water passed over the solar radiation receiving unit.

In a second state, the glass panes 3 are opaque and so reduce the quantity of light incident on the solar-radiation receiving panels 2. The light that would have otherwise reached the panels 2 is either substantially reflected or absorbed by the glass panes 3. As a consequence of less light striking the panels 2, less light is absorbed by the panels 2, less light energy is converted into thermal energy and so less thermal energy is produced by the panels 2. As a result, the panels 2 do not transfer as much heat to the water within the space 25 above the panels 2 and to the liquid within the tubes 43 which pass through the panels 2. The temperature increase of the swimming pool water and of the liquid within the panels 2 is therefore substantially prevented compared to that in the first state.

In an initial state, the swimming pool water is cooler than a desired temperature. The user initiates the control process and sets a desired temperature.

As the temperature of the water is below the desired temperature, the control process sets the electrochromic glass panes 3 to a substantially transparent state. Light now passes through the glass panes 3 and is absorbed by the panels 2 below. The panels 2 consequently increase in temperature and transfer some of their heat energy to the water within the space 25 and to the stationary water within the panels 2. The temperature of the swimming pool water consequently increases in the manner described above.

Figure 2:
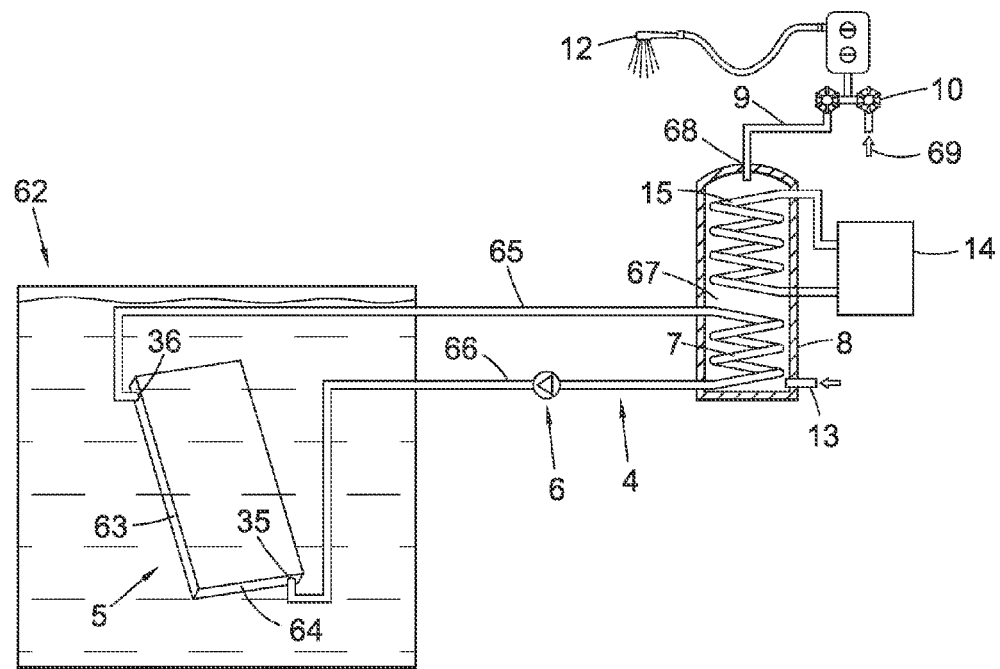
FIG. 2 is a schematic of the solar water heater connected by a series of pipes to a heat exchanger in a water tank.

When the swimming pool water eventually reaches the desired temperature an in-line pump is activated which circulates water within the panels to a heat exchanger in an energy storage means such as a water tank as described in further detail in relation to FIG. 2. This circulation causes heat to be continually supplied to the water within the water tank. When the water within the water tank reaches a predetermined temperature, neither the water within the swimming pool or within the water tank require further heating and so the electrochromic glass panes 3 are set to a substantially opaque state in which light is no longer permitted to irradiate the panels 2 below and the in-line pump deactivated. Consequently, no further heating of the water within either the swimming pool or water tank occurs.

A schematic of an example of a solar energy system for providing heated water 4 to a shower 12 or other domestic appliance is shown in FIG. 2. A single substantially planar solar-radiation receiving panel 2 is submerged within a body of water 5. The panel 2 is substantially inclined to the horizontal. In this example, the panel 2 comprises only one fluid inlet 35 and only one fluid outlet 36. The fluid outlet 36 is located on a lateral side face 63 of the panel. The fluid inlet 35 is located on a longitudinal side face 64 of the panel. For clarity, the network of tubes within the panel is not shown. Also not shown for clarity is the electrochromic glass. A first length of pipework 65 connects the panel's fluid outlet 36 aperture to a heat exchanger 7. The heat exchanger 7 is in the form of a coil of tubing, preferably composing a material of high thermal conductivity such as a metal. A second length of pipework 66 connects the heat exchanger 7 to the panel's inlet aperture 35. A pump 6 is connected in-line with the second length of pipework 66. The pump 6 circulates the fluid within the panel 2 around the circuit formed by the first length of pipework 65, the heat exchanger 7, the second length of pipework 66 and the network of tubes 43 within the panel 2.

The heat exchanger 7 is located within a water tank 8. The water tank 8 contains a body of water 67. In operation, the temperature of the fluid that passes within the heat exchanger's 7 tubing is greater than the temperature of the water 67 within the wafer tank 8. The heat from the fluid within the heat exchanger 7 is thus conducted through the tubing to the water 67 within the water tank 8.

The water tank 8 comprises an additional heat exchanger 15 by which an alternative source of heat may be supplied to the water tank 8, e.g. from a gas boiler 14. The additional heat exchanger 15 is in the form of a coil of tubing. A gas boiler 14 is provided which heats a fluid which is then passed by a pump means (not shown) through the additional heat exchanger 15. The fluid within the additional heat exchanger 15 is hotter than the water 67 within the water tank 8 such that heat is conducted through the additional heat exchanger's 15 coiled tubing to the water 67 within the water tank 8. The gas boiler can be used to supplement the heat produced by the solar radiation receiving means.

The pump means may be operated according to the temperature of fluid in the water tank or in a secondary fluid circuit 11.

The wafer tank 8 further comprises a water inlet 13, preferably located towards the bottom of the water tank 8. Cool water is supplied to the water tank 8 through the water inlet 13 in order to replenish the water 67 within the water tank 8. The cool water is preferably from the mains supply. The water tank 8 also comprises a water outlet 68 which is spaced from the water inlet 13 and is preferably located towards the top of the wafer tank 8.

The water outlet 68 is connected to an outlet pipe 9. Heated water is extracted from the water tank 8 through the outlet pipe 9. A blending valve 10 is connected in-line with the outlet pipe 9. The blending valve 10 is connected to an external supply of cool water 69. The blending valve 10 adds cool water to the heated water within the outlet pipe 9 in order to reduce the temperature of the water downstream of the blending valve 10. Once cooled, the heated water is passed along the outlet pipe 9 to a shower 12 or other appliance for which hot water is required.

In an alternative embodiment (not shown), the solar radiation receiving unit may be formed as a photovoltaic cell. The cell can be used similarly as the solar radiation receiving unit of FIG. 1 to heat the pool by convection, but may also produce current which can be transferred to a storage means such as a battery.

Figure 3:
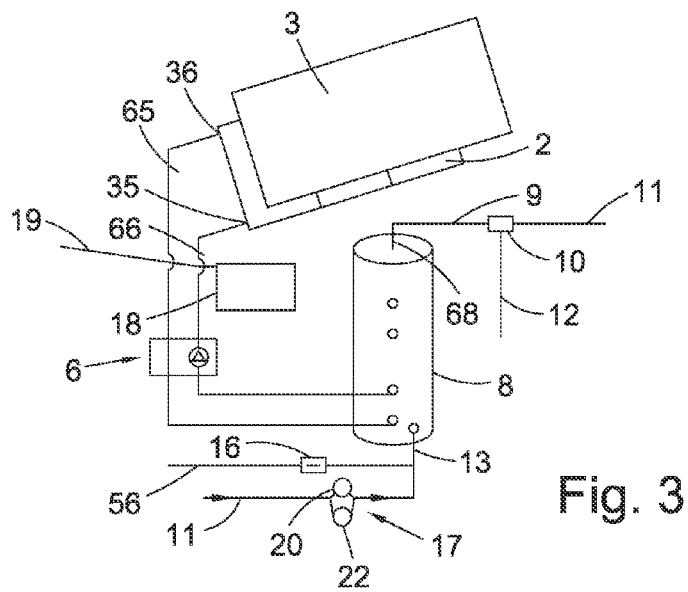
FIG. 3 is a schematic of electrochromic glass arranged over a solar water heater, and of a water tank and a secondary circuit.

FIG. 3 is a schematic showing a further example of a solar energy system similar to that shown in FIG. 2. This particular configuration allows multiple appliances to be supplied with hot water by providing a secondary circuit 11. The solar energy system of FIG. 3 comprises a row of electrochromic glass panes 3 arranged over a row of solar-radiation receiving panels 2 with a first 65 and second 66 length of pipework connecting the heat exchanger to the inlet 35 and outlet 36 apertures respectively of the row of panels 2. This arrangement of electrochromic glass panes and solar-radiation receiving panels functions similarly to the system described in relation to FIG. 1. The first 65 and second 66 lengths of pipework are connected to a tank 8. A pump 6 is connected in line with the first length of pipework 65 and circulates fluid around the circuit of the first and second lengths of pipework. The secondary circuit 11 is connected to an outlet 68 of the water tank 8. The secondary circuit is connected to the water tank via an inlet 13 to form a loop along which multiple appliances may be added.

The water is pumped around the secondary circuit 11 by a twin pump arrangement 17, located between the last appliance on the secondary circuit 11 and the water tank inlet 13. The twin pump arrangement 17 comprises two pumps 20, 22. One of the two pumps 20 is controlled by a gas boiler's thermostatic controller in the case where a gas boiler provides supplementary heat to the tank 8 similarly to the embodiment of FIG. 2. The other pump 22 is controlled by a wire 19 leading to a wire centre or control unit 18. The control unit or wire centre 18 may be provided as a programmable control unit or other unit by which a user can control the system. The wire centre may be controlled by an E-bus, radio frequency (RF) signal or mobile phone or other wireless connection. The twin pump arrangement 17 enables the flow of water around the secondary circuit 11 to be controlled by either the wire centre 18 or the gas boiler thermostatic controller, or a combination thereof. The twin pump arrangement 17 circulates the water around the secondary circuit 11.

The system can be configured such that the barrier means 3 is controlled to permit solar radiation to irradiate the solar radiation receiving unit 2 when the temperature of water in the secondary circuit 11 falls below a set temperature, for example 45 degrees centigrade.

This agitation of the water, in combination with its temperature being maintained in the manner described above, seeks to inhibit the growth of *Legionella* bacteria within the water of the secondary circuit 11.

A blending valve 10 is connected on the secondary circuit 11 between the water tank outlet 9 and the first appliance on the secondary circuit 11. The blending valve 10 may be used to add cool water from an external water supply 12 to the heated water within the secondary circuit 11. An additional external water supply 56 is also connected to the secondary circuit 11 downstream of the twin pump arrangement 17 in order to ensure that the water level in the tank 8 is maintained at a predetermined level. The flow of water into the secondary circuit 11 from this external water supply 56 is controlled by a check valve 16 which is connected in-line with the external water supply 56.

Figure 4:
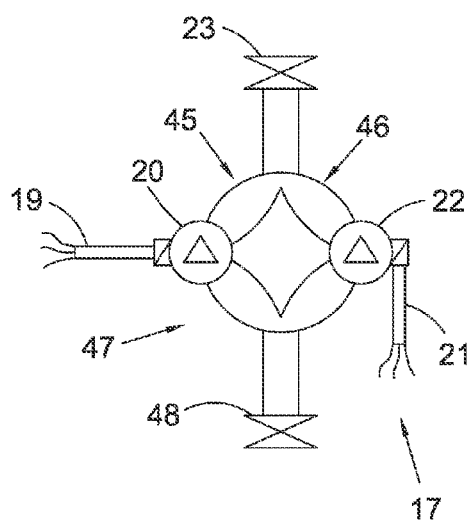
FIG. 4 is a schematic of a secondary circuit pumping means with an arrangement of valves.
Figure 5:
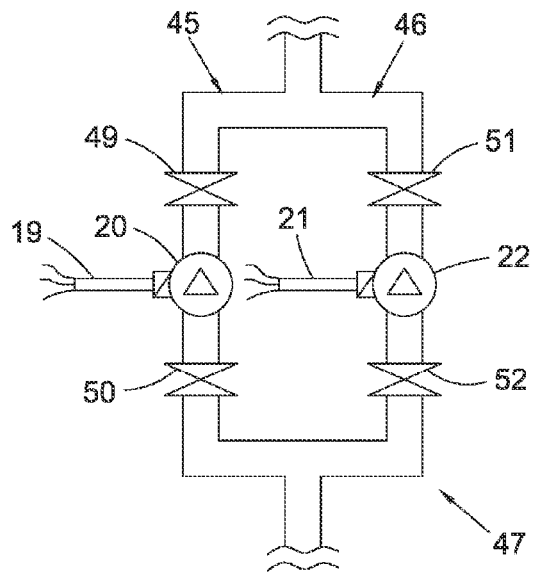
FIG. 5 is a schematic of a secondary circuit pumping means with an alternative arrangement of valves.

Two examples of a twin pump arrangement 17 are shown in FIG. 4 and FIG. 5. Either of these two examples of twin pump arrangement 17 can be used in the solar energy system of FIG. 3. In both FIG. 4 and FIG. 5, the two pumps 20, 22 are connected in a parallel circuit 47 comprising two branches 45, 46 such that one pump is located on each branch. One of the pumps 20 is operated by a wire centre or control unit 18 via an electrical cable 19 running from the wire centre 18 to the pump 20. The other pump 22 is controlled by a conventional gas boiler thermostatic controller, the control signal being carried by an electrical wire 21 connected to the pump 22. In FIG. 4, a valve 23 is located upstream of the parallel circuit 47. Another valve 24 is located downstream of the parallel circuit 47.

FIG. 5 shows an alternative arrangement with two valves 49, 50 and 51, 52 being located on each branch 45, 46 of the two branches of the parallel circuit 47, one valve 50, 52 being located upstream of the pump 20, 22 and the other valve 49, 51 being located downstream of the pump 20, 22. The twin pump arrangement 17 shown in FIG. 4 is advantageous in that fewer valves are required in this arrangement compared to that shown in FIG. 5. The pumps 20, 22 within the twin pump arrangement 17 of FIG. 4 are consequently easier and quicker to remove and reinstall should both pumps 20, 22 be required to be replaced. The arrangement shown in FIG. 5 is advantageous in that it allows one of the pumps to continue to operate if the other becomes defective or while the other is being replaced.

Figure 6A:
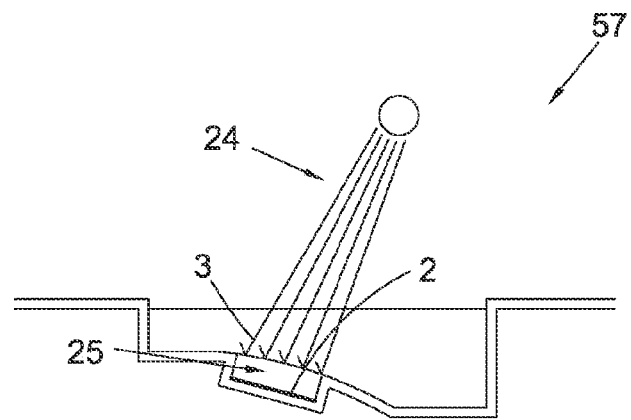
Figure 6B:
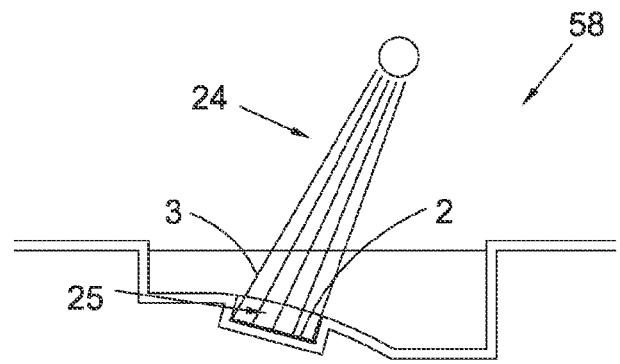

FIG. 6a and FIG. 6b are schematics of the swimming pool comprising a solar energy system shown in FIG. 1 in which the interaction of solar radiation with the electrochromic glass 3 in a first state 57, FIG. 6a, and second state 58, FIG. 6b, is depicted. The swimming pool comprises a row of solar radiation receiving panels 2 recessed in a curved section of the swimming pool floor 41. The panels 3 are inclined to more directly face the incident solar radiation. This can be designed according to the peak solar radiation which may be incident on the panels 3. A row of electrochromic glass, in the embodiment curved panes 2, are spaced over the solar-radiation receiving panels 2 at a height such that the glass panes 3 lie flush with the surrounding swimming pool floor 41.

In a first state, the electrochromic glass panes 3 are substantially opaque. Sunlight 24 travels through the swimming pool water until it strikes the surface of the glass panes 3. Being opaque and substantially reflective, the glass panes 3 prevent the incident sunlight 24 from reaching the panels 2 by reflecting the incident sunlight 24 away from the panels 2 and back through the swimming pool water.

In a second state, the electrochromic glass panes 3 are substantially transparent. Sunlight 24 travels through the swimming pool water. Upon reaching the electrochromic glass panes 3, the sunlight 24 is permitted to pass through them and continues to travel towards the panels 2 below. The sunlight 24 strikes the panels 2 and is absorbed by them, with little to no sunlight 24 being reflected by the panels 2. The absorption of sunlight 24 causes the panels 2 to increase in temperature. This thermal energy is then transferred to the swimming pool water within the space 25 between the glass panes 3 and the panels 2, and also to the fluid within the row of panels 2.

Figure 7:
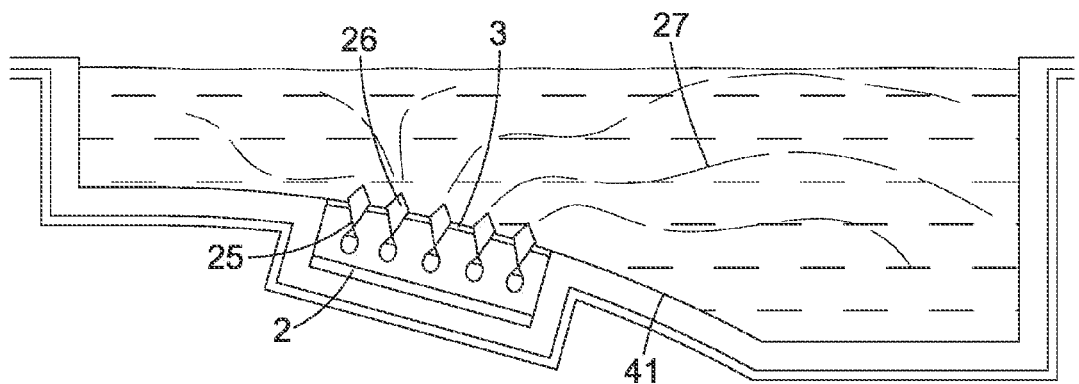
FIG. 7 is a section view of a swimming pool with electrochromic glass and a solar water heater recessed in the floor of the swimming pool.

FIG. 7 is a cross section view of the swimming pool comprising a solar energy system of FIG. 1 in which the convection currents 27 within the swimming pool water are shown. In this diagram, the swimming pool is shown containing water. A row of substantially rectangular solar-radiation receiving panels 2 is located within a recess in a curved floor 41 of the swimming pool. For clarity, the network of tubes passing within the solar radiation receiving panels and a support structure are not shown.

A row of curved electrochromic glass panes 3 is positioned spaced from the row of panels 2 and aligned with the swimming pool floor 41 on either side of the row of glass panes 3. The row of glass panes 3 and the row of panels 2 are spaced such that a water-filled space 25 exists between them.

Heated water within the space 25 flows through apertures 26 in the glass panes 3 and intermixes through convection currents with the cooler main body of swimming pool water 5 above the glass panes 3. Due to the decrease in pressure within the space 25 as a result of heated water having escaped from the space 25, or due to differences in the density between water at different temperatures in the body of water, cooler water is drawn into the space 25 from the main swimming pool water 5, through the apertures 26 in the glass panes 3. The swimming pool also comprises a conventional filtration and pump system which agitates the swimming pool water and further aides the dispersion of heat throughout the swimming pool water. Heat is thus transferred from the space 25 to the main body of swimming pool water 5. This intermixing and agitation causes the average temperature of the main body of swimming pool water 5 to increase.

Figure 8:
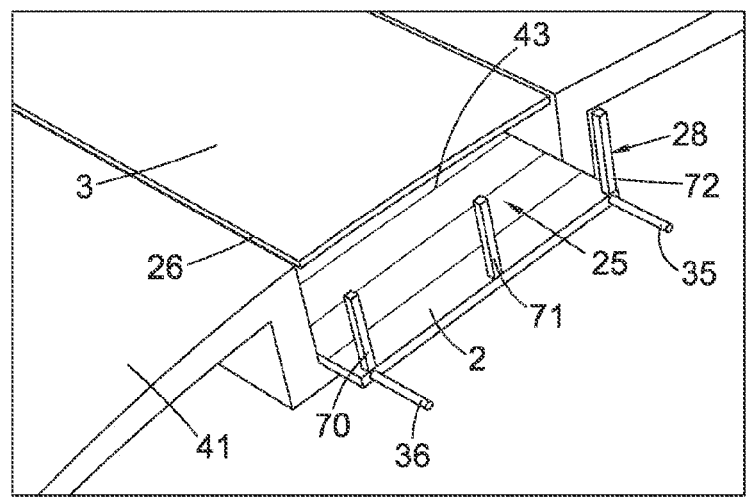
FIG. 8 is a schematic of barrier means of varying solar radiation transmittance in a first state substantially reflecting solar radiation and in a second state substantially transmitting solar radiation.

A close-up perspective cutaway view of the swimming pool comprising a solar energy system is shown in FIG. 8 in which the support array and the space between the electrochromic glass and solar radiation receiving panel is shown in greater detail. A row of substantially rectangular solar radiation receiving panels 2 is located within a recess in a curved floor 41 of the swimming pool. The row of panels 2 extends across the entire width of the swimming pool floor 41. The panels comprise a network 43 of longitudinal and lateral tubes within the panels 2 through which fluid flows. An inlet 35 and outlet 36 to the network of tubes 43 is provided at one end of the row of panels 2.

An array of supports 28 sits above the panels. Within the array of supports 28, three support members 70, 71, 72 are located along the width of the row of panels 2 at equal intervals such that two support members 70, 72 are located at either end of the width of the row of panels 2 with a third support member 71 located midway between them. This pattern of three supports is repeated at equal intervals along the entire longitudinal length of the row of panels, thus forming the support array 28.

A row of curved electrochromic glass panes 3 sits above this support array 28 such that the glass panes 3 are supported by the support array 28. This serves to make the glass panes sufficiently supportive and rigid to support the weight of a user of the swimming pool. The glass panes 3 lie flush with the swimming pool floor 41 on either side of the row of panes 3. A gap 26 exists between the row of glass panes 3 and the surrounding swimming pool floor 41 such that water is able to ingress the space 25 between the row of glass panes 3 and the row of panels 2.

Figure 9:
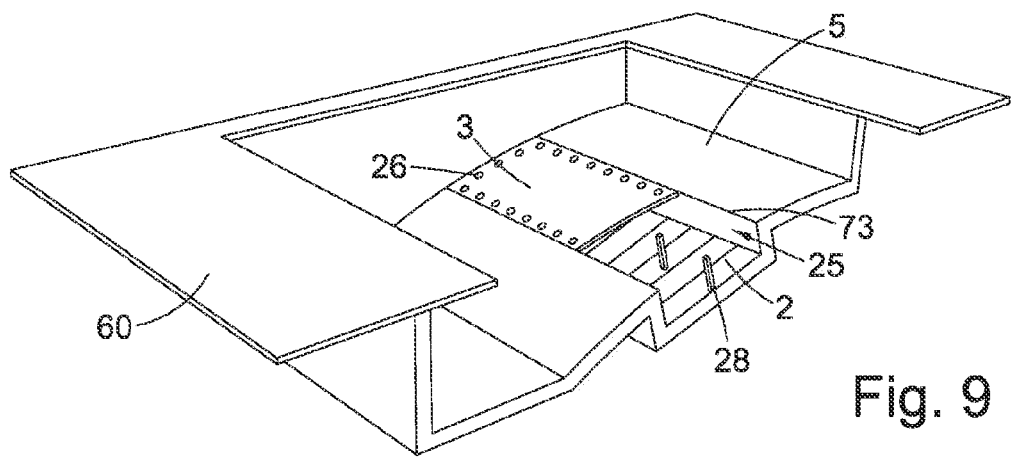
FIG. 9 is a perspective cutaway view of the swimming pool with apertures within the electrochromic glass.

A further example of a swimming pool comprising a solar energy system, substantially similar to that shown in FIG. 1, is shown in FIG. 9, in which a cutaway perspective view of the swimming pool is presented.

A row of colinear support members 28, square in cross section, are located at equal intervals along the longitudinal centreline of the row of panels 2. The row of colinear support members 28 extends across the entire length of the row of panels 2.

A curved electrochromic glass pane 3 sits on top of the row of support members 28 such that it is spaced from the panels 2 below. The pane 3 is held at a height such that the uppermost surface of the glass pane 3 lies flush with the uppermost edge 73 of the surrounding swimming pool floor 41 formed by the recess. The perimeter of the glass pane 3 abuts the side faces of the recess within the swimming pool floor 41. The glass pane 3 composes a series of circular apertures 26 arranged around the perimeter of the glass pane 3. The circular holes 26 extend entirely through the thickness of the glass pane 3. When the swimming pool is filled with water, water is permitted to flow between the main body of swimming pool water 5 and the water within the space 25, through the series of circular holes 26 in the glass pane 3.

Figure 10:
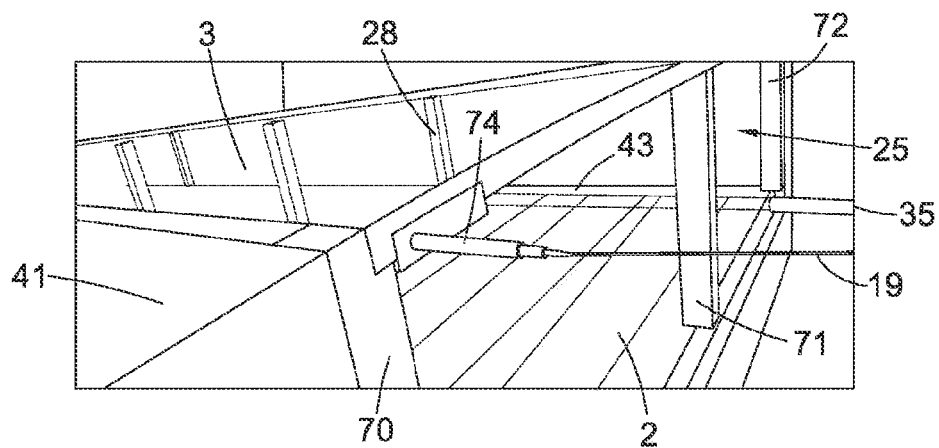
FIG. 10 is a perspective cutaway view of the swimming pool with electrochromic glass as shown in FIG. 8 with the solar water heater recessed in the floor of the swimming pool and showing the support structure and electrical power cable and to control the electrochromic glass.

FIG. 10 shows a close-up cutaway perspective view of the swimming pool comprising a solar energy system of FIG. 1. The system comprises a solar radiation reserving unit 2 and a barrier means of varying solar radiation transmittance 3 arranged over said solar radiation receiving unit 2. For clarity, the water within the swimming pool is not shown.

Four rectangular and substantially planar solar-radiation receiving panels 2 are recessed into the curved section of the swimming pool floor 41 and lie such that they are inclined to the horizontal. The panels each comprise a network of tubes 43 which pass within each panel 2. A fluid inlet 35 to the network of tubes 43 is shown at one end of the row of panels 2. The network of tubes 43 is configured to allow fluid to pass through them.

Curved electrochromic glass panes 3 sit above the panels 2 such that a space 25 is formed between the glass panes 3 and the panels 2. The glass panes 3 are aligned in a row of substantially the same area and coextensive with the row of panels 2. The glass panes 3 are of the same curvature as that of the curved section 41 of the swimming pool floor. The glass panes 3 are spaced above the panels 2 such that their upper surface aligns with the surrounding swimming pool floor 41.

An array of supports 28 sits between the panels 2 and the glass panes 3. Within the array of supports 28, three support members 70, 71, 72 are located along the width of the row of panels 2 at equal intervals such that two support members 70, 72 are located at either end of the width of the row of panels 2 with a third support member 71 located midway between them. This pattern of three supports 70, 71, 72 is repeated at equal intervals along the entire longitudinal length of the row of panels 2, thus forming the support array 28.

An electrical power cable 19 is connected to the electrochromic glass 3 via an electrical connector 74. The electrical connector 74 is received by an electrical connector socket 75. The electrical power cable 74 provides electrical power by which the transmittance of the electrochromic glass panes 3 is varied.

Figure 11:
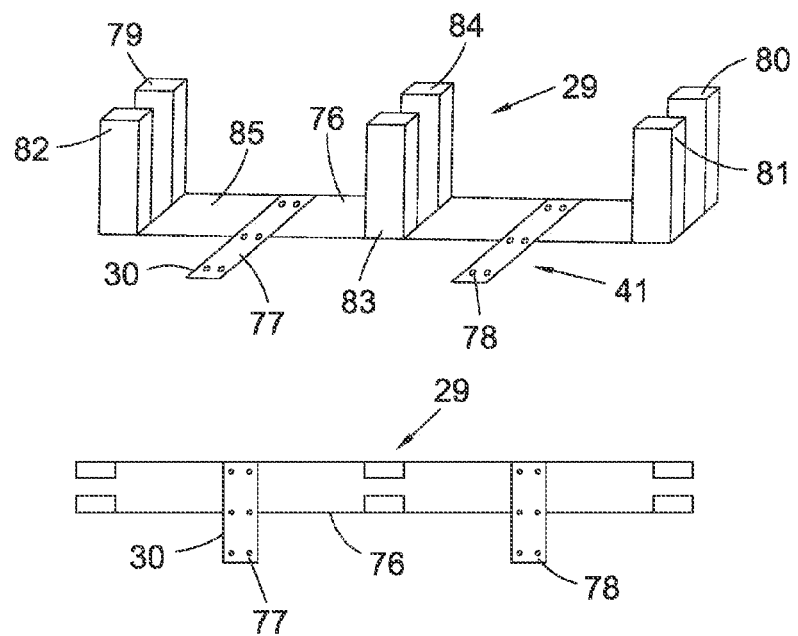
FIG. 11 is a perspective view of a bracket which enables the electrochromic glass to be removed from the swimming pool.

FIG. 11 shows a bracket system 29. The bracket system 29 is hingedly fixed to the swimming pool floor 34. The bracket system 29 comprises a flat rectangular plate 76. The flat plate 76 comprises two hinges 77, 78 located along the panel's length.

Six arms 79-84 of equal length extend from, and in a plane which is substantially parallel to, the perimeter of the bracket's uppermost surface 85. One of the six arms 79, 80, 81, 82 is located in each of the rectangular plate's four corners. The other two arms 83, 84 are located at the centre of both the plate's longitudinal edges.

The arms 79-84 are configured to receive the electrochromic glass panes. The electrochromic glass panes are not shown for clarity. The electrochromic glass panes may be rotated about the pivot point of the hinges 77, 78 in order to lower the panes into position above solar-radiation receiving panels for maintenance purposes.

Figure 12:
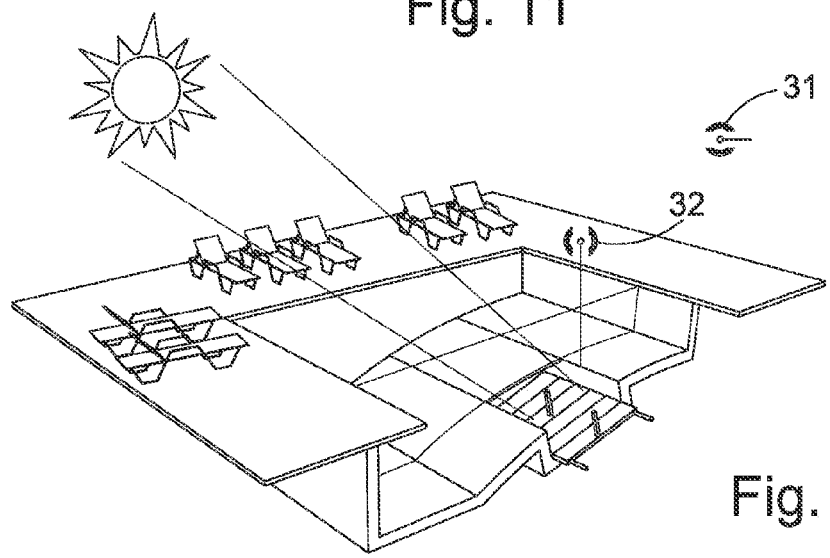
FIG. 12 is a perspective cutaway view of the swimming pool with wireless transmitter and receiver.

FIG. 12 shows the solar energy system similar to that shown in FIG. 1, further composing wireless signal transmitters and wireless signal receivers 31, 32. For increased signal quality, the wireless transmitters and wireless receivers 31, 32 are not submerged within the swimming pool water. The wireless transmitters and receivers 31, 32 form a wireless connection. The wireless connection is used to connect a remote user-operated control unit to the central control unit. The user-operated control unit is used to activate and deactivate the control process. The user-operated control unit also displays the temperature of the swimming pool water and enables the user to specify the desired temperature of the swimming pool water.

Figure 13:
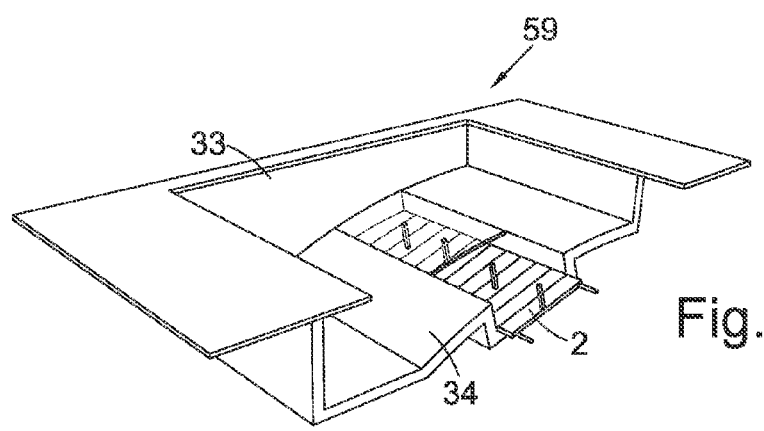
FIG. 13 is a perspective cutaway view of the swimming pool comprising substantially reflective walls.

FIG. 13 shows the solar energy system of that shown in FIG. 1, further comprising a swimming pool structure 59 with substantially reflective walls 33. Although not shown, the walls within the recess may also be substantially reflective. The substantially reflective walls 33 of the swimming pool increase the available quantity of solar radiation incident on a row of four rectangular and substantially planar solar-radiation receiving panels 2.

In an alternative embodiment (not shown) the system could be used without the barrier means with the pump being used to pump water around the secondary circuit when a temperature below around 45 degrees centigrade is reached and the solar radiation receiving unit being used to heat the water either directly or via a heat exchanger in the secondary circuit.

While the embodiments described have been shown in combination and placed in a swimming pool, the solar energy system could be used placed away from the swimming pool for example on a roof and used to heat water pumped within the solar radiation receiving unit or by pumping a heat transfer fluid to a heat exchanger arrangement to heat water to be provided to a swimming pool or any other appliance requiring hot water.

The applications of the system of the present invention include roof top heating systems, heating systems on boats and ships where heating water using fossil fuels or electricity is inefficient or requires fuel to be transported. The present system allows 'free' solar energy to be utilised in an advantageous manner.

It is envisaged that the skilled person in the art may make various changes to the embodiments specifically described above without departing from the scope of the invention.

What is claimed is:

1. A solar energy system for heating a body of water, the system comprising:
a solar radiation receiving unit that receives solar radiation and converts said solar radiation into heat energy;
a barrier that varies solar radiation transmittance arranged over said solar radiation receiving unit, wherein the barrier varyingly controls the solar radiation receivable by said solar radiation receiving unit, the barrier comprising an electrochromic material;
a controller that automatically controls the solar radiation transmittance of the barrier based on a temperature;
a sensor for measuring said temperature;
a first pump that pumps a fluid through said solar radiation receiving unit and a first fluid circuit through which fluid can be pumped through said radiation receiving unit;
an energy storage device comprising a tank, wherein the first pump pumps fluid from the solar radiation receiving unit to the tank; and
a heat exchanger for transferring heat from the solar radiation receiving unit to the energy storage device, wherein the heat exchanger is fluidly connected to the first fluid circuit.

2. A solar energy system for heating a body of water, the system comprising:
a solar radiation receiving unit that receives solar radiation and converts said solar radiation into heat energy;
a barrier that varies solar radiation transmittance arranged over said solar radiation receiving unit, wherein the barrier varyingly controls the solar radiation receivable by said solar radiation receiving unit, the barrier comprising an electrochromic material;
a controller that automatically controls the solar radiation transmittance of the barrier based on a temperature;
a sensor for measuring said temperature;
a first pump that pumps a fluid through said solar radiation receiving unit and a first fluid circuit through which fluid can be pumped through said radiation receiving unit;
an energy storage device comprising a tank, wherein the first pump pumps fluid from the solar radiation receiving unit to the tank;
a secondary fluid circuit fluidly connected to said energy storage device, wherein the secondary fluid circuit is fluidly isolated from the first fluid circuit; and
a second pump that pumps fluid around the secondary fluid circuit.

3. The system of claim 2, wherein the second pump is activated when the temperature in the secondary fluid circuit or energy storage device falls below a predetermined temperature.

4. The system as claimed in claim 2, wherein the second pump comprises a twin pump.

5. The system of claim 2 further comprising:
a further heat source that supplies energy to the energy storage device.

6. A method of heating a body of water, the method comprising:
providing a solar radiation receiving unit configured to receive solar radiation and convert said solar radiation into heat energy;
providing a barrier for varying solar radiation transmittance arranged over said solar radiation receiving unit, wherein the barrier is configured to varyingly control the solar radiation receivable by said solar radiation receiving unit, and the barrier comprises an electrochromic material;
providing a controller that is configured to automatically control the solar radiation transmittance of the barrier based on a temperature;
providing a sensor for measuring said temperature;
configuring the barrier in a first state in which it substantially permits the transmission of solar radiation;
configuring the barrier in a second state in which it substantially prevents the transmission of solar radiation once a predetermined temperature has been reached in the body of water;
wherein the solar radiation receiving unit and barrier means are provided, in use, submerged in a body of water contained in a structure such that the heat energy from the solar radiation receiving unit is transferred to the water contained in the structure;

pumping, using a first pump, a fluid through said solar radiation receiving unit;
isolating fluidly, a first fluid circuit from the body of water in said volume, through which fluid can be pumped through said radiation receiving unit;
activating the first pump for pumping fluid through the solar receiving unit when a predetermined temperature has been reached or exceeded in the body of water;
providing an energy storage device comprising a tank;
configuring the first pump to pump fluid from the solar radiation receiving unit to the water tank;
providing a secondary fluid circuit fluidly connected to said energy storage device, wherein the secondary fluid circuit is fluidly isolated from the first fluid circuit;
providing a second pump for pumping fluid around the secondary fluid circuit; and
configuring the barrier in a said first state when the temperature of fluid in the secondary circuit or tank falls below a predetermined temperature.

* * * * *